United States Patent [19]

Winkler

[11] Patent Number: 5,371,919
[45] Date of Patent: Dec. 13, 1994

[54] COUPLING ELEMENT FOR ADJUSTABLE HAND LEVER MECHANISM

[76] Inventor: John Winkler, 3247 S. El Dorado Dr., New Berlin, Wis. 53151

[21] Appl. No.: 83,654

[22] Filed: Jun. 25, 1993

[51] Int. Cl.⁵ ............................................. E05B 7/00
[52] U.S. Cl. .................................. 16/114 R; 403/321
[58] Field of Search ............ 16/114 R; 403/359, 325, 403/321, 322; 81/58.3, 58.4, 58

[56] References Cited
U.S. PATENT DOCUMENTS

| | | | |
|---|---|---|---|
| 2,452,742 | 11/1948 | Franzene | 403/321 |
| 2,603,325 | 7/1952 | Pickard | 81/58.3 |
| 2,607,253 | 8/1952 | Gearhart | 81/58 |
| 2,862,746 | 12/1958 | Deliso | 403/359 |
| 3,865,500 | 2/1975 | Newell | 403/359 |
| 4,161,891 | 7/1979 | Bossert | 16/114 R |
| 4,460,204 | 7/1984 | Olsen | 16/114 R |
| 4,586,614 | 7/1986 | Kipp | 81/58.3 |
| 4,929,113 | 5/1990 | Sheu | 403/325 |

Primary Examiner—P. Austin Bradley
Assistant Examiner—Chuck Y. Mah
Attorney, Agent, or Firm—Whyte Hirschboeck Dudek

[57] ABSTRACT

An adjustable hand lever mechanism is provided that comprises a coupling element of a trapezoidal configuration embedded in a hand lever. The coupling element is made from a material, e.g. metal, that is harder than the material, e.g. plastic, from which the hand lever is made. The coupling element does not include lugs, projections or similar features, and is designed to engage a fastening element in such a manner as to effect rotation of the fastening element when rotational force is applied to the hand lever without rotational slippage between the coupling element and the hand lever.

10 Claims, 2 Drawing Sheets

COUPLING ELEMENT FOR ADJUSTABLE HAND LEVER MECHANISM

BACKGROUND OF THE INVENTION

This invention relates to hand adjustable lever mechanisms. In one aspect, the invention relates to an adjustable hand lever mechanism comprising a nonmetallic handle in combination with a metallic coupling element, while in another aspect, the invention relates to a metallic coupling element of a nonannular design. In yet another aspect, the invention relates to a metallic coupling element with a trapezoidal configuration.

Adjustable hand lever mechanisms and similar items are well-known in the clamping and fastener art. These devices are used in applications in which frequent, multiple adjustments and/or clampings are required, e.g. on various industrial equipment, where tools are not practical due to space restrictions. Typically, these mechanisms attach to a spindle, shaft or similar device. As such, the adjustable hand lever mechanism must be able to rotatably engage and disengage the spindle, etc. and it usually accomplishes this through the action of a fastening element.

Various hand lever mechanisms are described by Kipp in U.S. Pat. No. 4,598,614 which is incorporated herein by reference. The mechanisms of most interest to Kipp are those comprising a nonmetallic hand lever and a metallic coupling element. As explained by Kipp, cost and weight consideration favor a nonmetallic, preferably a plastic, hand lever mechanism, but torque considerations favor a metallic coupling element since this element almost always engages a metallic fastening element.

As further described by Kipp, if the hand lever mechanism is to be useful for its intended purpose, then the metallic coupling agent must be incorporated into the nonmetallic hand lever in such a manner that one does not rotate with respect to the other during the operation of the hand lever mechanism. Kipp addressed this concern by designing his coupling element to have an annular configuration equipped with anchoring elements, e.g. projecting elements arranged uniformly along the outer periphery of the coupling element. These anchoring elements are embedded in the hand lever and as such, resist rotation of one about the other during the operation of the hand lever mechanism. While this design is generally effective for its intended purpose, alternative coupling designs are desirable for a number of reasons, including cost of manufacture, ease of assembly, operational effectiveness, and the like. Of particular interest are coupling element designs that do not include lugs, projections or similar protruding parts, either on the coupling element periphery or elsewhere on the element.

SUMMARY OF THE INVENTION

According to this invention, an adjustable hand lever mechanism is provided that comprises a coupling element of a trapezoidal configuration embedded in a hand lever. The coupling element is made from a material that is harder than the material from which the hand lever is made, the former preferably metallic and the latter preferably plastic. The coupling element does not include lugs, projections or similar features, and is designed to engage a fastening element in such a manner as to effect rotation of the fastening element when rotational force is applied to the hand lever. Preferably, the fastening element is made from a material as hard as the coupling element. The trapezoidal design of the coupling element ensures a fixed relationship between it and the adjustable hand lever during the operation of the hand lever mechanism.

DESCRIPTION OF THE PREFERRED EMBODIMENT

Like numerals are employed to designate like parts throughout the drawings.

Figure 1:
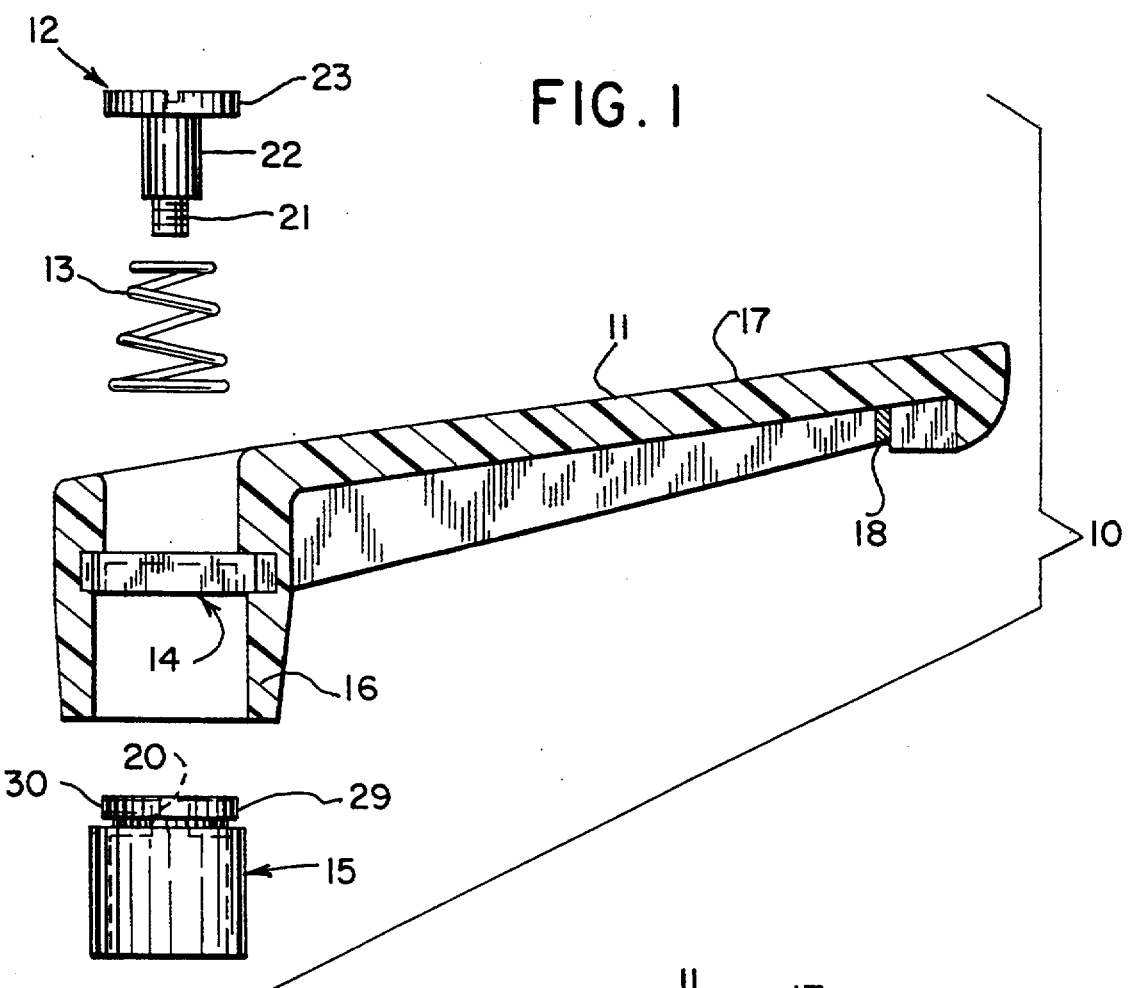
FIG. 1 is an exploded sectional view of one embodiment of an adjustable hand lever mechanism of this invention.
Figure 2:
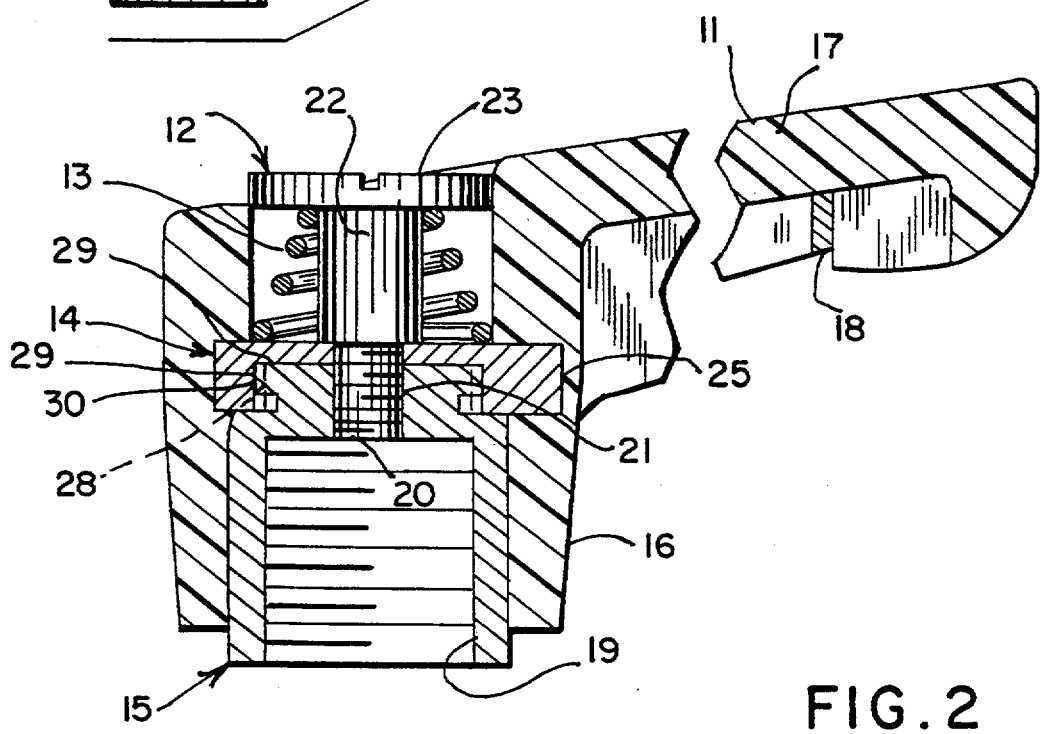
FIG. 2 is an assembled sectional view of the adjustable hand lever mechanism of FIG. 1.

In FIGS. 1 and 2, an adjustable hand lever mechanism 10 is shown in exploded detail comprising hand lever 11, screw 12, spring 13, coupling element 14, and fastening element 15. Hand lever 11 is an integral, one-piece casting (preferably formed by injection molding) comprising a sleeve 16 and a grip handle 17, grip handle 17 reinforced at its distal end by intermediate wall 18. Hand lever 11 is made of a material which is soft relative to the material from which coupling element 14 is made, and it is preferably made from a plastic which in its cured form is rigid and durable. The plastic can and preferably does contain an inert filler, e.g. fiberglass, carbon black, etc., to obtain various desirable physical properties, e.g. strength, surface finish, etc., and/or aesthetic appeal.

Fastening element 15 is shaped to fit within sleeve 16 of hand lever 11, and it contains an internal cavity with female screw threads 19 adapted to receive the end of a spindle, shaft or like device (not shown) equipped with male screw threads at one end. The size and length of the threads, and the length of the spindle, shaft or similar device, can vary widely. At the upper end of the cavity of fastening element 15 are female screw threads 20, but these screw threads extend over a shorter length of fastening element 15 and define a smaller cavity diameter than those of female screw threads 19.

Fastening element 15 is adapted to receive threaded shank 21 of screw 12 which contains a nonthreaded shank 22 immediately above threaded shank 21. Screw 12 is designed to fit within conical compression spring 13 such that the upper section of spring 13 bears against the underside of screw head 23 and the lower section of spring 13 bears upon the upwardly facing trapezoidal surface of coupling element 14 (see FIG. 3B).

Figure 4A:
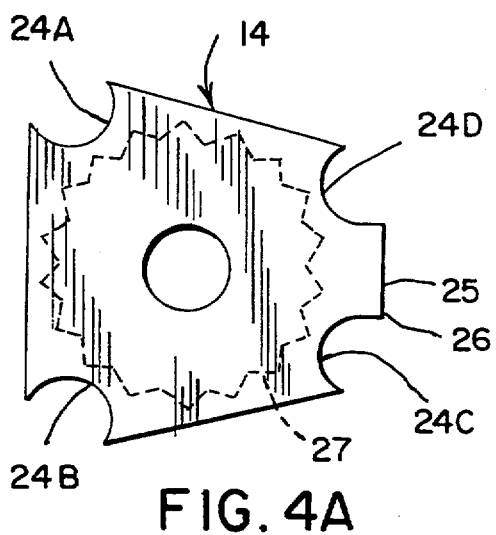
FIG. 4A is a top view of the coupling element of FIG. 3B.
Figure 4B:
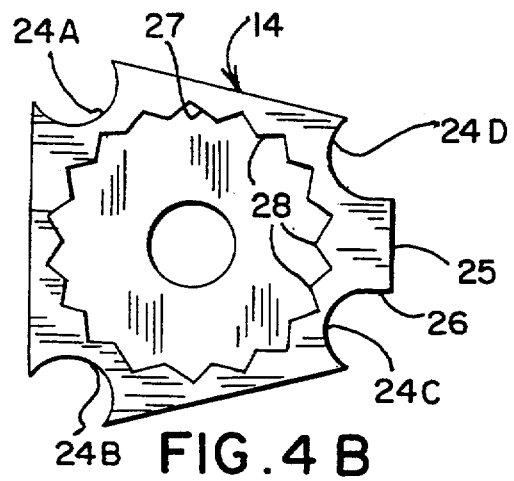
FIG. 4B is a bottom view of the coupling element of FIG. 4A.

Coupling element 14, two embodiments of which are shown in greater detail in FIGS. 4A and 4B, is made of a material which is hard relative to the material from which hand lever 11 is made, and preferably is made from metal, e.g. zinc, aluminum, stainless steel, an alloy, etc., or a material with metal like properties relative to deformation resistance, e.g. engineering plastics, various composites, such as ceramic/metal composites, and the like. Coupling element 14 is fixed within hand lever 11 in such a manner such that one will not rotate relative to the other when adjustable hand lever mechanism 10 is in clamping operation. Coupling element 14 is fixed to hand lever 11 by embedding the former into the latter during the manufacturing process, typically during the injection molding of hand lever 11.

Figure 3A:
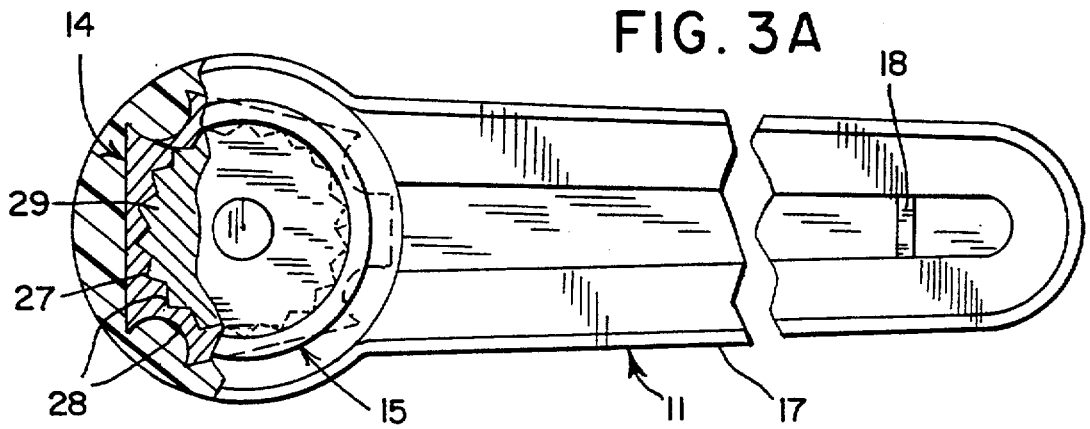
FIG. 3A is a bottom view of the hand lever in combination with the coupling element of FIG. 1.
Figure 3B:
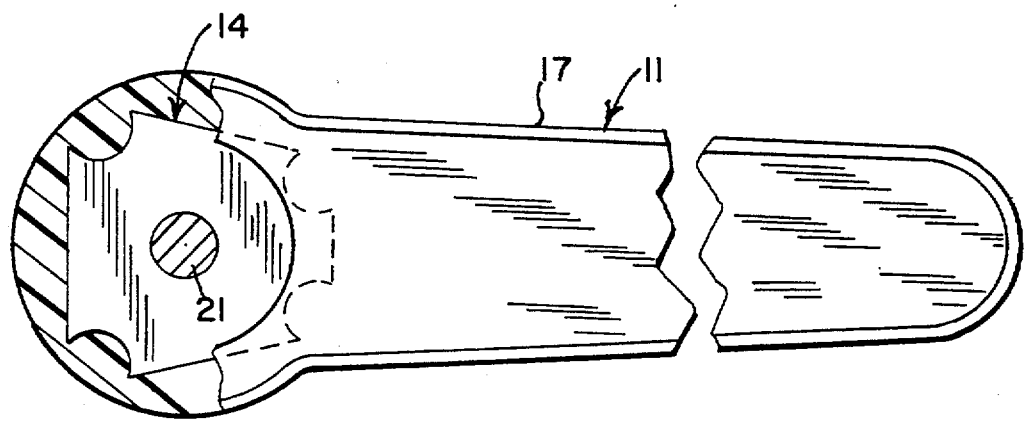
FIG. 3B is a top view of the hand lever in combination with the coupling element of FIG. 1.

FIGS. 4A and 4B show the planar top and bottom sides of coupling element 14. In FIG. 4A, a preferred embodiment, the element has a trapezoidal configuration with semicircular notches 24A–D cut from each corner. The size and shape of the notches can vary to convenience, but those depicted in these Figures are preferred. Notches 24C–D are cut particularly deep along wall 25 such that wall 25 is not tangent to the outer circumference of inner rim 27 of the bottom planar surface (shown in phantom relief). This results in tab 26 at the narrow end of the trapezoidal configuration, and this tab is aligned with the long axis of grip handle 17 in the placement of coupling element 14 within hand lever 11 (as depicted in FIG. 3B). This results in additional resistance to movement of one relative to the other when a rotational force is applied to hand lever 11 by way of grip handle 17. In another trapezoidal configuration of coupling element 14 (not shown), the corner notches are absent. This particular embodiment requires more material of construction than the embodiment of FIG. 4A and as such, is less preferred.

The opposite or bottom planar side of the coupling element 14 is shown in FIG. 4B, and it comprises a tooth inner rim 27 having inwardly extending gear teeth 28. The flanks of gear teeth 28 are extended generally parallel to a turning axis of a spindle or similar device (not shown) which is to be connected with fastening element 15.

Formed on the upwardly pointing end of fastening element 15 is a complimentary coupling element 29 (see FIG. 1). This element is shaped in the form of a pinion and has radially outwardly directed gear teeth 30 which correspond in shape, size and pitch to teeth 28 of toothed rim 27, and which are adapted to engage with teeth 28. The pinion on which teeth 30 are formed and the toothed rim 27 with teeth 28 are engaged with each other under the force of pressure spring 13. Thus, hand lever 11 and fastening element 15 are rotatably coupled with each other by engagement of the coupling element 14 and the complimentary coupling element 29. The coupling and uncoupling of fastening element 15 and complimentary coupling element 29 is accomplished in the same manner as described in U.S. Pat. No. 4,598,614. Preferably, the complimentary coupling element 29 is made of a material as hard as the material of coupling element 14, more preferably of the same material.

Unlike the annular coupling element described in U.S. Pat. No. 4,598,614, coupling element 14 is trapezoidal in configuration. As such, the coupling element of this invention does not require anchoring elements, e.g. pins, lugs, etc., to securely fasten it within hand lever 11 such that one does not rotate relative to the other when rotational force is imparted to hand lever 11. This resistance to rotational movement is enhanced by the presence of tab 26 which is aligned with the longitudinal axis of grip handle 17.

Although the invention has been described in detail by the figures, this detail is for the purpose of illustration only and is not intended as a limitation upon the spirit and scope of the appended claims.

What is claimed is:

1. A coupling element of a trapezoidal configuration for incorporation into an adjustable hand lever mechanism, the coupling element adapted to engage a fastening element such that when the coupling and fastening elements are engaged and a rotational force is applied to the hand lever, the fastening element rotates in the direction of the rotational force without the coupling element and the hand lever rotating relative to one another.

2. The coupling element of claim 1 in which each corner of the trapezoidal configuration is notched.

3. The coupling element of claim 2 in which the notches are of a semicircular configuration.

4. The coupling element of claim 3 in which the semicircular notches at the corners of the narrow end of the trapezoidal configuration are sufficiently deep to form a tab at the narrow end of the trapezoidal configuration.

5. An adjustable hand lever mechanism adapted for turning a device about an axis, the adjustable hand lever mechanism comprising:

A. A fastening element adapted to placed in engagement with a device to be turned;

A hand lever made of a material softer than the material from which the fastening element is made;

A coupling element with top and bottom planar sides and of a trapezoidal configuration consisting of a material of at least the same hardness as the material from which the fastening element is made, the top planar side of the coupling element firmly affixed to the hand lever and the bottom planar side adapted to engage the fastening element such that the coupling element will rotate the fastening element in a direction consistent with a rotational force applied to the hand lever;

D. Coupling members formed on the coupling element and distributed along its periphery, the coupling members being formed on the opposite side of the coupling element facing the fastening element and comprising gear teeth formed as a toothed rim with the gear teeth facing radially inwardly;

E. A complimentary coupling element formed on the fastening element engaging the coupling members of the coupling element, the complimentary coupling element being formed as a pinion having gear teeth radially outwardly directed and shaped to engage the teeth of the toothed rim of the coupling element, the coupling element and the complimentary coupling element being capable of engaging and disengaging by relative movement of one in the direction of the axis;

F. Spring means acting in the direction of the axis urging the coupling element and the complimentary coupling element in rotative engagement of each other; and G. A screw member threadedly engaged in the fastening element and extending through the coupling element with the spring means being engaged between the screw member and the coupling element;

the fastening element being in the form of a sleeve with the hand lever being formed with an end thereof having a sleeve-like configuration, and the fastening element being arranged longitudinally displaceable within the sleeve-like configuration of the one end of the hand lever.

6. The adjustable hand lever mechanism of claim 5 in which the hand lever is made of plastic and the coupling element is made of metal.

7. The adjustable hand lever mechanism of claim 6 in which each corner of the trapezoidal coupling element is notched.

8. The adjustable hand lever mechanism of claim 7 in which each notch of the coupling element is of a semicircular configuration.

9. The adjustable hand lever mechanism of claim 8 in which the semicircular notches at the corners of the narrow end of the trapezoidal configuration are such that the narrow end forms a tab.

10. The adjustable hand lever mechanism of claim 9 in which the coupling element is embedded in the hand lever such that the tab of the coupling element is aligned with the long axis of the hand lever.

* * * * *